May 19, 1970     G. L. HANSEN     3,512,542
PROPORTIONAL CONTROL DEVICE FUNCTIONING AS
CUT-OFF VALVE FOR CONSTANT PRESSURE SYSTEM
Filed Feb. 11, 1964
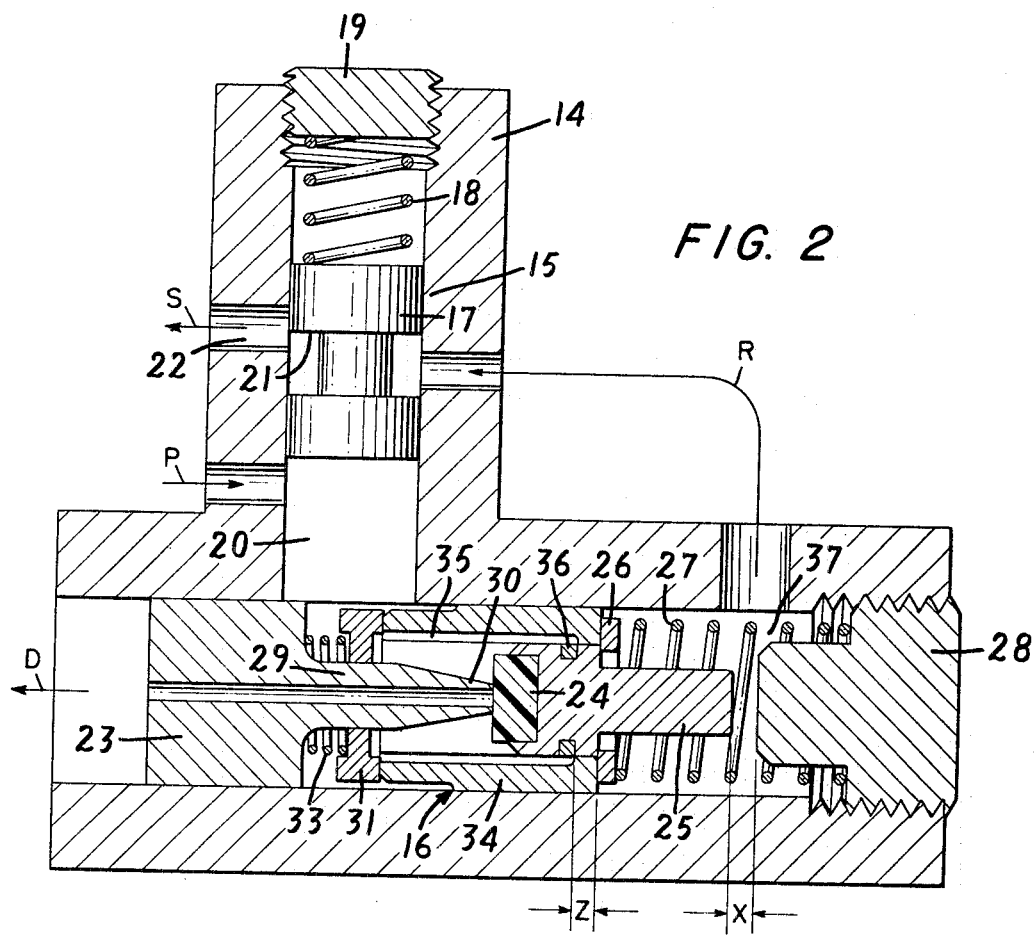
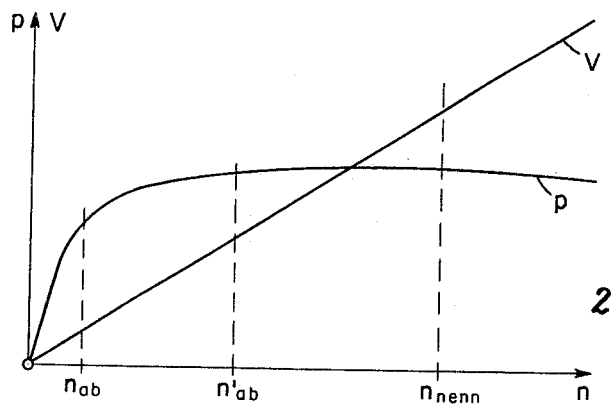
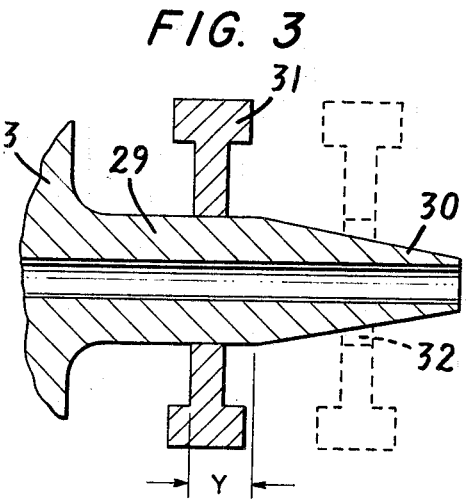

United States Patent Office 3,512,542
Patented May 19, 1970

3,512,542
PROPORTIONAL CONTROL DEVICE FUNCTIONING AS CUT-OFF VALVE FOR CONSTANT PRESSURE SYSTEM
Gummar Lyshoj Hansen, Nordborg, Denmark, assignor to Danfoss ved ing. M. Clausen, Nordborg, Denmark, a company of Denmark
Filed Feb. 11, 1964, Ser. No. 343,999
Claims priority, application Germany, Feb. 20, 1963, D 40,943
Int. Cl. G05d 16/08
U.S. Cl. 137—115                                    4 Claims This invention relates generally to incompressible fluid pressure systems operating at a constant output pressure and control devices therein and more particularly to a proportional control device therefor.

In hydraulic or incompressible fluid systems under pressure being supplied by a pump automatic proportional control devices such as cut-off valves are used for shutting off supply to the system downstream of the pump when the pressure drops below a certain level, for example, when the pump supplying the fluid under pressure is secured. In these systems the cut-off valve responds to the decreasing pump pressure to carry out its cut-off function. Thus, for example, in a fuel system in a fuel burning apparatus in which an electric pump supplies fuel under pressure to a discharge nozzle or burner the usual cut-off valve shuts off supply to the burner due to the pressure drop when the pump is switched off, for example under control of temperature sensing means. The cut-off valve will, of course re-open when pressure is again restored.

The known systems in which it is desired to cut-off supply substantially instantaneously after a pump is secured or turned off the automatic cut-off valve functions only after a considerable time lag after the pump is switched-off and has almost stopped because the known cut-off valves respond to pressure which does not decrease in the system until the pump speed or revolutions have decreased considerably, for example, to approximately 15% of the normal operating speed of the pump. This is principally due to the fact that in the known hydraulic systems and more particularly in known fuel oil burning installations pressure-regulating valves are combined with the cut-off valve, usually in a single unit adjustable by a single control spring, and the fluid pressure in the system is maintained substantially constant by the pressure-regulating valve which controls the pressure and seeks to maintain it constant by returning greater or lesser quantities of hydraulic fluid, for example oil, to the suction side of the pump or into a supply tank, for example an oil supply tank.

It is a principal object of the present invention to provide a proportional control device comprising a cut-off valve responsive to the volume of oil or flow delivered by a pump and not to output pressure in the line in which it is connected thereby to close the line automatically in response to a selected pressure differential developed in the valve and which is a function of the quantity of oil flowing through the line.

Another object is to provide an automatic valve for isolating or securing line flow downstream from the valve in response to a given variation of the quantity of fluid supplied upstream of the valve corresponding to the fluid output of a pump, for example a fluid output directly proportional to the number of revolutions of a supply pump.

Still another object of the present invention is the provision of a cut-off valve suitable, for automatic cut-off operation, to any desired setting of percentage drop to be permitted in the flow or quantity of oil flowing in or delivered to a line in which the valve is connected.

A feature of the automatic cut-off valve according to the invention is the provision of a variable opening control means adjustable to control a control point or point of cut-off by variably controlling a relative displacement between two members, adjustable by a separate adjusting spring from that of a pressure-regulating valve in the system functioning to keep the pressure constant in a line by controlling fluid return to the output source.

The cut-off valve according to the invention comprises two relatively movable control elements or parts defining a variable orifice varying in flow area in response to changes in the quantities of fluid in a line being sensed and capable of developing a pressure differential internally of the valve in which the difference pressure is proportional to the flow or quantity of oil being supplied to the line in which the cut-off line is connected and representative of the liquid quantity output of the supply source, for example a pump. By adjusting the permitted relative movement controlling the flow area of the variable orifice and differential pressure, the control point or point of cut-off with respect to the permitted quantity of flow drop, as against a pressure drop in a line, can be set and constitutes the control point at which quantity or flow variations will effectively render the cut-off valve effective. The valve includes means for permitting a very limited relative movement between these two members or a larger relative movement thereby providing a wide range of control point settings.

Another feature of the proportional control device or cut-off valve according to the invention is the provision of a flow sensing and measuring device having an actuator element therein actuated in response to movement of one of the two heretofore mentioned relatively movable control elements proportionally to flow variations of a compressible fluid flow being sensed by the control elements. The two control elements define a variable orifice having a variable flow area in dependence upon variations of the flow being sensed and the differential pressures developed across the orifice and the variable flow area of the orifice are proportional to the flow variations; the actuator element is displaced by the movable control element proportionally to the variations in flow. The actuator element is provided with a coupling mechanism comprising a friction clutch effective to unseat a valving member comprising a valve disc in said device during travel of said actuator element representative of a change of flow of said incompressible fluid above a given flow level or volume and for seating said disc in dependence upon a variation or change of said flow proportionate to a decrease in said flow to a given reduced flow level thereby opening and closing an opening controlled by said disc and closing said opening when a reduced flow level below said given level or value obtains. The control points or points at which the disc opens and closes said opening are a function of the flow and correspond to said given flow level or volume and are set by controlling the point, flow level, at which the actuator element will seat and unseat the valve disc. In order to adjustably set the cut-off control point an adjustable spring is provided in the device for adjusting a spring force to be overcome by the actuator element in travelling in response to flow increases.

Another feature of the invention is the provision of a cut-off valve separate from a pressure-regulating valve and separately adjustable even though the two valves can be constructed with a same valve casing or housing.

Other features and advantages of the proportional control device in accordance with the present invention will be better understood as described in the following specification and appended claims, in conjunction with the following drawings in which:

FIG. 1 is a diagram for illustrating the principles of the invention;

FIG. 2 is a sectional view of a cut-off valve according to the invention and illustrates the cut-off valve in conjunction with a pressure-regulating valve in a common casing;

FIG. 3 is a fragmentary enlarged view of two adjustable relatively movable control elements of the cut-off valve in FIG. 2.

While the proportional control device according to the invention will be described as a cut-off valve applied to a constant pressure fuel oil system, it will be understood that it may be embodied in different form and is equally applicable to all types of hydraulic systems or systems having therein an incompressible fluid under pressure and in which isolation of a part of the system downstream of the control device is desired in response to a sufficient flow decrease, change or volume drop, below a given level, of incompressible fluid or liquid supplied to a line being sensed or in which the device is disposed.

As illustrated in the diagram in FIG. 1 in the usual fuel oil system or hydraulic system, particularly one in which a pressure-regulating valve is connected for maintaining a discharge pressure constant, the pressure illustrated by a pressure curve $p$, has a rapid rise and the curve has a sharp slope when a pump in the system start up and then substantially flattens out and remains substantially constant regardless of the increase of speed $n$ of a pressure source, for example pump revolutions, indicated on the abscissa of the diagram. It can be seen from this diagram that if a proportional control device, for example a cut-off valve, is responsive to pressure variations, for example when a pump in the system is turned off, there is a considerable lag in rendering the cut-off valve effective from the point at which the pump is operating at rated revolutions designated $n_{nominal}$. The earliest control point at which the cut-off valve is effective is a cut-off point designated on the curve as $n_{ab}$ which is substantially the point at which the pump speed has dropped considerably and the knee of the curve is reached. This is a considerable lag from the time the pump is turned off to the time the control device or cut-off valve is rendered effective. On the other hand, the volume or flow changes are linear and are illustrated by the straight line designated $v$. Flow or volume of incompressible fluid delivered is substantially linearly proportional to the pump speed or revolutions $n$ thereof. Thus, if a control point, for example a cut-off point, is to be determined as a function of volume rather than pressure, the control point is reached much more rapidly without lag once a pump is turned off and is slowing down and can be reached, for example at the point on the straight line along an ordinate $n'_{ab}$ or any point between $n'_{ab}$ and $n_{nominal}$.

The proportional control device according to the invention is embodied as a cut-off valve applied to a constant pressure system, for example a fuel oil system in which an electric driven pump, not shown, is connected to a source of incompressible fluid, for example an oil tank, and discharges through a discharge line, not shown, to a nozzle or burner, not shown. The cut-off valve, according to the invention and later described, is connected in the discharge line intermediate the pump and the nozzle. It being understood, that the cut-off valve is intended to isolate or cut-off the system or portion thereof downstream of the valve when the pump is turned off, for example, in response to the sensing of a temperature or the like.

The cut-off valve according to the invention is illustrated diagrammatically in detail in FIGS. 2 and 3. Although the cut-off valve is illustrated as being housed in a common housing or casing as a pressure regulating valve, as hereinafter described, it will be understood by those skilled in the art that the cut-off valve can be constructed completely separately from the pressure-regulating valve and installed with connecting conduits thereto. In the drawing a pressure-regulating valve 14 in a valve body or housing 15 cooperates with a proportional control device or cut-off valve 16 comprising in the same housing a sensing and quantity or volume measuring device sensing and measuring the quantity of fluid or flow through a conduit, for example the conduit as hereinafter described. The pressure-regulating valve comprises a control valve member or floating valve spool 17 biased against oil pressure by a spring 18 adjustably set by an adjusting screw 19. An incompressible fluid under pressure, for example fuel oil, enters a valve chamber 20 through a valve port or passageway under pressure in the direction of the arrow designated P and biases the valve spool 17 against the spring 18. The fluid is provided from a pressure source for example from a pump, not shown. As hereinafter described, the cut-off valve 16 in an open condition allows fluid to flow through it and along a flowpath designated by an arrow R so that return fluid enters through a valve port between operative piston portions of the spool 17 and flows through the pressure regulating valve as a face of a piston portion 21 of the spool opens a return port or passageway 22 for oil along the path designated by an arrow S back to the pressure source, for example to the suction side of the pump. The cut-off valve 16, moreover, as later described controls and allows fluid to flow to a portion of the controlled system downstream of the cut-off valve, for example, toward a fuel oil nozzle, not shown, along an outlet path designated by an arrow D.

The cut-off valve comprises a valve member 23 which is press fitted therein and has an axial bore or fluid passageway therethrough as illustrated which has an opening which is valved to an opened and closed condition by a valve member comprising a resilient valve disc 24 fixed to an actuating piston 25 operable axially and circumferentially of which is disposed an annulus 26 biased in a direction toward the left in the drawing by an adjusting spring 27 adjustably set by an adjustment screw 28. The valve member 23 is provided with a cylindrical extension 29 through which the axial passageway extends and has a terminal end face defining a seat about the bore opening valved by the disc 24. The extension 29 has a conical or tapered end portion 30 circumferentially of which is disposed a ring 31 fitting snugly over the cylindrical portion 29, as illustrated in FIG. 3, during its axial travel along an axial length Y of the projection under the effect of oil under pressure in the compartment 20. The ring 31 is movable axially relatively the portion 29 and tapered portion 30 so that in the position illustrated in broken lines in FIG. 3, an annular orifice or aperture 32 is defined between the tapered portion 30 and the inner surface of the ring 31 varying in cross-section or flow area in dependence upon the relative position of the ring 31 relative to the tapered portion 30. The axial position of the control element or ring 31 is at least in part dependent upon a differential developed across the orifice 32. It can be seen that as the quantity of oil or flow from the pressure source varies, the velocity of the oil through the variable orifice 32 change so that the pressure differential across the orifice varies in dependence upon the fluid flow through the variable orifice 32 whereby the axial position of the ring 31 is a function of at least the volume of oil flowing through the inlet port along the path P.

The ring 31 is biased by a spring 33 in a direction for engaging in a substantially fluid-tight manner a tubular control and actuator element 34 having a plurality of axial passageways 35 angularly spaced internally therein and is provided with a friction clutch portion having a reduced internal diameter for frictionally engaging an enlarged portion of the piston 25 along an axial length Z. A rubber ring 36 may be provided on the piston 25 to further effect the friction coupling or clutch between the actuator element 34 and the piston 25. This friction coupling is a lost motion mechanism functioning as later described. The actuator 34 is actuated axially in response to flow variations proportionately thereto by the proportionate control member or ring 31 until the spring 27 establishes a condition of equilibrium as hereinafter disclosed.

In a condition in which the force of the spring 27 overcomes the fluid flow sensing and measuring device formed by the control members 29, 30, 31, the spring 27, and the actuator 34, the valve disc 24 is seated and the cut-off valve is closed. As the fuel oil under pressure flow increases the pressure in the chamber 20 under pressure increases and urges the ring 31 in a direction toward the tapered portion 30 along the length Y and allows fuel flow through the controlled orifice 32 and through the axial passageways 35 of the control member 34. Since the ring 31 has moved in a direction toward the right, it displaces the tubular actuator element 34 toward the right so that the right-hand terminal portions of the passageways 35 are uncovered after the tubular control element 34 moves relative to the enlarged diameter of the piston 25 an axial distance Z so that fluid flows into the compartment 37 and along the path R and outwardly through the valve port 22 as before described.

During the axial travel of the actuator element 34 toward the right, the piston 25 is frictionally engaged therewith and is moved toward the right thereby unseating the resilient valve disc 24 from the seat circumferentially of the axial bore or opening through the valve body 23 so that fluid flows outwardly along the path D downstream of the cut-off valve, for example to a nozzle. The axial travel of the piston 25 is limited, for example to a distance X, and it abuts the adjusting screw 28 and thus disengages from the actuator. This axial travel of the piston is less than the axial travel of the ring 31 along the length Y. The travel of the valve disc can thus be controlled and is, for example, in the order of one millimeter. It is after the piston 25 stops moving that the passageways 35 are opened and placed in communication with the compartment 37 and after the control ring member 31 has travelled the axial distance Y. The very limited axial movement of the valve disc 24 permits a very fine adjustment of the pressure differential by the spring 27 and thereby a fine adjustment of volume variations or range of flow variations which will open and close the cut-off valve.

Thus the ring 31 will cause axial travel of the tubular member 34 until a condition of equilibrium is established by the spring 27 which sets the control points for the volume of fluid or flow thereof. Since the valve disc 24 is unseated only a very small distance, a very minor downward change of volume or the flow of incompressible fluid into the cut-off valve can substantially, immediately render the valve effective and close it. It being understood, that for example by increasing the force applied by the spring the cut-off point can be set very close in time to the point at which a pump is turned off and the volume of fluid delivered or flow thereof drops due to the immediate drop in revolutions or speed, for example, in the pump. A drop in the volume or flow through the variable orifice of the valve will decrease the pressure differential across the orifice and the ring 31 will move toward the left and thereby allow the tubular control element 34 to be biased in a direction toward the left by the spring 27 so that the frictional coupling between the piston 25 and the tubular member is again rendered effective and the valve piston 25 is moved toward the left seating the valve disc 24 closing the cut-off valve.

The frictional coupling mechanism defined between the piston 25 and the actuator element 34 in effect is a lost motion mechanism in which the lost motion or lag between an effective flow and cut-off, is set by the spring 27. Thus as the force applied by the spring is increased the lag decreases from the time that a downward change in the pressure differential in the controlled orifice takes place and the piston 25 is frictionally engaged and the valving disc 24 reseated. The control point at which the valve unseats is principally determined by the axial length of travel Y of the control element 31 has to travel before the controlled orifice is effective and develops the pressure differential since during this travel the spring 27 is being compressed. Those skilled in the art will recognize that large increases in fluid flow in the flow being sensed does not result in large pressure differentials since the measuring device will enlarge the controlled orifice when the flow increases so that the pressure differential across the orifice will remain about the same and the sensitivity of the cut-off valve is maintained.

The pressure regulating valve 14 maintains a constant output pressure by returning fuel back to the fuel pump suction. Moreover, the pressure in the system downstream of the control devices of the system can be maintained constant by having the pressure regulating valve respond to the pressure on the downstream side of the controlled orifice so that the pressure of the nozzle, for example is thereby kept absolutely constant. Furthermore the valve can be connected in the controlled system at other suitable points.

While a preferred embodiment of the invention has been shown and described, it will be understood that many modifications and changes can be made within the true spirit and scope of the invention.

What I claim and desire to secure by Letters Patent is:

1. A control apparatus for automatically controlling a control point at which flow of an incompressible fluid is to be cut off in a controlled incompressible fluid pressure system comprising a proportional control device comprising, two control elements relatively movable axially defining internally of said device jointly in relative positions an orifice having a variable flow area in dependence upon relative operative positions of said control elements, one of said two control elements being disposed in operation to sense and respond by movement to variations of flow of an incompressible fluid in said controlled system and to vary the flow area of said orifice in dependence upon variations of said flow and to develop jointly with the other of said control elements a pressure differential across said orifice varying in dependence upon said variations of flow of said incompressible fluid, means defining a seat in said device having an opening therein through which flow of said incompressible fluid is to be controlled, a valve element operable to a seated position on said seat closing said opening and an unseated position for allowing flow of said fluid from said orifice through said opening, an actuator element actuated in response to movement of said one of said two relatively movable control elements proportionately to flow variations of said fluid being sensed, said actuator element having coupling means to unseat said valve element during travel of said actuator element representative of a change of said fluid flow above a given level and for seating said valve element in dependence upon a variation of said flow of fluid being sensed proportionate to a decrease in said flow being sensed to a given reduced flow level thereby closing said opening when said reduced flow level obtains, and means to limit the movement of said valve element to travel less than the possible travel of said actuator element and to establish within said reduced flow level a selected value at which said valve element seats independent of a flow value established at said orifice.

2. A control apparatus according to claim 1, comprising a spring for determining said given level of said flow.

3. A control apparatus according to claim 1, comprising a pressure-control device upstream of said proportional control device for controlling the pressure of said fluid being sensed by said proportional control device.

4. A proportional control device for automatically controlling a control point at which flow of an incompressible fluid is to be cut off in a controlled incompressible fluid pressure system comprising, two coaxial control elements relatively movable axially defining internally of said device jointly in relative positions an orifice having a variable flow area in dependence upon relative axial positions of said control elements, one of said two control elements being disposed in operation to sense and respond by movement to variations of flow of an incompressible fluid in said controlled system and to vary the flow area of said orifice in dependence upon variations of said flow and to develop jointly with the other of said control elements a pressure differential across said orifice varying in dependence upon said variations of flow of said incompressible fluid, means defining a seat in said device having an opening therein through which flow of said incompressible fluid is to be controlled, a valve element operable to a seated position on said seat closing said opening and an unseated position for allowing flow of said fluid from said orifice through said opening, an actuator element actuated in response to movement of said one of said two relatively movable control elements proportionately to flow variations of said fluid being sensed, said actuator element having coupling means to unseat said valve element during travel of said actuator element representative of a change of said fluid flow above a given level and for seating said valve element in dependence upon a variation of said flow of fluid being sensed proportionate to a decrease in said flow being sensed to a given reduced flow level thereby closing said opening when said reduced flow level obtains, and means to limit the movement of said valve element to travel less than the possible travel of said actuator element and to establish within said reduced flow level a selected value at which said valve element seats independent of a flow value established at said orifice.

References Cited

UNITED STATES PATENTS

| | | | |
|---|---|---|---|
| 2,135,007 | 11/1938 | Kamenarovic | 137—627.5 X |
| 2,656,014 | 10/1953 | Fites | 137—627.5 X |
| 2,749,935 | 6/1956 | Heard | 137—116 |

FOREIGN PATENTS 693,748  7/1940  Germany.

WILLIAM F. O'DEA, Primary Examiner

D. R. MATTHEWS, Assistant Examiner

U.S. Cl. X.R.

137—563